US010237345B2

(12) United States Patent
Park et al.

(10) Patent No.: US 10,237,345 B2
(45) Date of Patent: Mar. 19, 2019

(54) APPARATUS AND METHOD FOR DATA SYNCHRONIZING OF ENERGY MANAGEMENT SYSTEM

(71) Applicant: LSIS CO., LTD., Gyeonggi-do (KR)

(72) Inventors: Jong-Ho Park, Gyeonggi-do (KR);
Myung-Hwan Lee, Gyeonggi-do (KR);
Seung-Ju Lee, Gyeonggi-do (KR);
Yeo-Chang Yoon, Gyeonggi-do (KR);
Shin-Jo Kong, Gyeonggi-do (KR);
Jang-Hyeok Yun, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 303 days.

(21) Appl. No.: 15/254,256

(22) Filed: Sep. 1, 2016

(65) Prior Publication Data

US 2017/0070569 A1    Mar. 9, 2017

(30) Foreign Application Priority Data

Sep. 3, 2015 (KR) .................. 10-2015-0125163

(51) Int. Cl.
*G06F 15/16* (2006.01)
*H04L 29/08* (2006.01)
(Continued)

(52) U.S. Cl.
CPC .......... *H04L 67/1095* (2013.01); *G06F 9/445* (2013.01); *G06F 9/52* (2013.01); *G06Q 50/06* (2013.01); *H04L 67/42* (2013.01)

(58) Field of Classification Search
CPC ..... H04L 67/1095; H04L 67/42; G06F 9/445; G06F 9/52
(Continued)

(56) References Cited

U.S. PATENT DOCUMENTS 8,401,710 B2   3/2013  Budhraja et al.
8,635,373 B1   1/2014  Supramaniam et al.
(Continued)

FOREIGN PATENT DOCUMENTS

CN    1976275 A    6/2007
CN  104780211 A    7/2015
(Continued)

OTHER PUBLICATIONS

Korean Office Action dated Oct. 13, 2016 corresponding to application No. 10-2015-0125163.
European Search Reports dated Jan. 5, 2017 corresponding to application No. 16184970.8-1954.
Yun, Jang-Hyeok, et al."Automatic Syncronization Method and Development of the Dispatcher Operating system for EMS"; LS industry System; Jul. 15, 2015.
Chinese Office Action for related Chinese Application No. 201610798292.7; action dated Dec. 5, 2019; (6 pages).

*Primary Examiner* — Tauqir Hussain
(74) *Attorney, Agent, or Firm* — K&L Gates LLP

(57) ABSTRACT

Disclosed embodiments relate to a synchronizing method of a client device in an energy management system. In some embodiments, the method includes: deciding a synchronization object server for downloading synchronization data; downloading the synchronization data from the decided synchronization object server; determining whether or not the status of operation of the client device is synchronizable, based on the downloaded synchronization data; and performing a synchronization operation for the downloaded synchronization data based on a result of the determination.

8 Claims, 3 Drawing Sheets

(51) Int. Cl.
G06F 9/445 (2018.01)
G06F 9/52 (2006.01)
G06Q 50/06 (2012.01)
H04L 29/06 (2006.01)

(58) Field of Classification Search
USPC .......................................................... 709/203
See application file for complete search history.

(56) References Cited

U.S. PATENT DOCUMENTS

| | | | |
|---|---|---|---|
| 2011/0131321 A1* | 6/2011 | Black | G06F 1/3203 709/224 |
| 2012/0022707 A1* | 1/2012 | Budhraja | H02J 3/008 700/292 |
| 2015/0025697 A1 | 1/2015 | Imes et al. | |

FOREIGN PATENT DOCUMENTS

| | | |
|---|---|---|
| JP | 2000112807 A | 4/2000 |
| JP | 2004206260 A | 7/2004 |
| JP | 2010171669 A | 8/2010 |
| JP | 2014186370 A | 10/2014 |
| KR | 20070059929 A | 6/2007 |
| KR | 1020070103668 A | 10/2007 |
| KR | 1020110081867 A | 7/2011 |
| WO | 2011066162 A | 6/2011 |

* cited by examiner

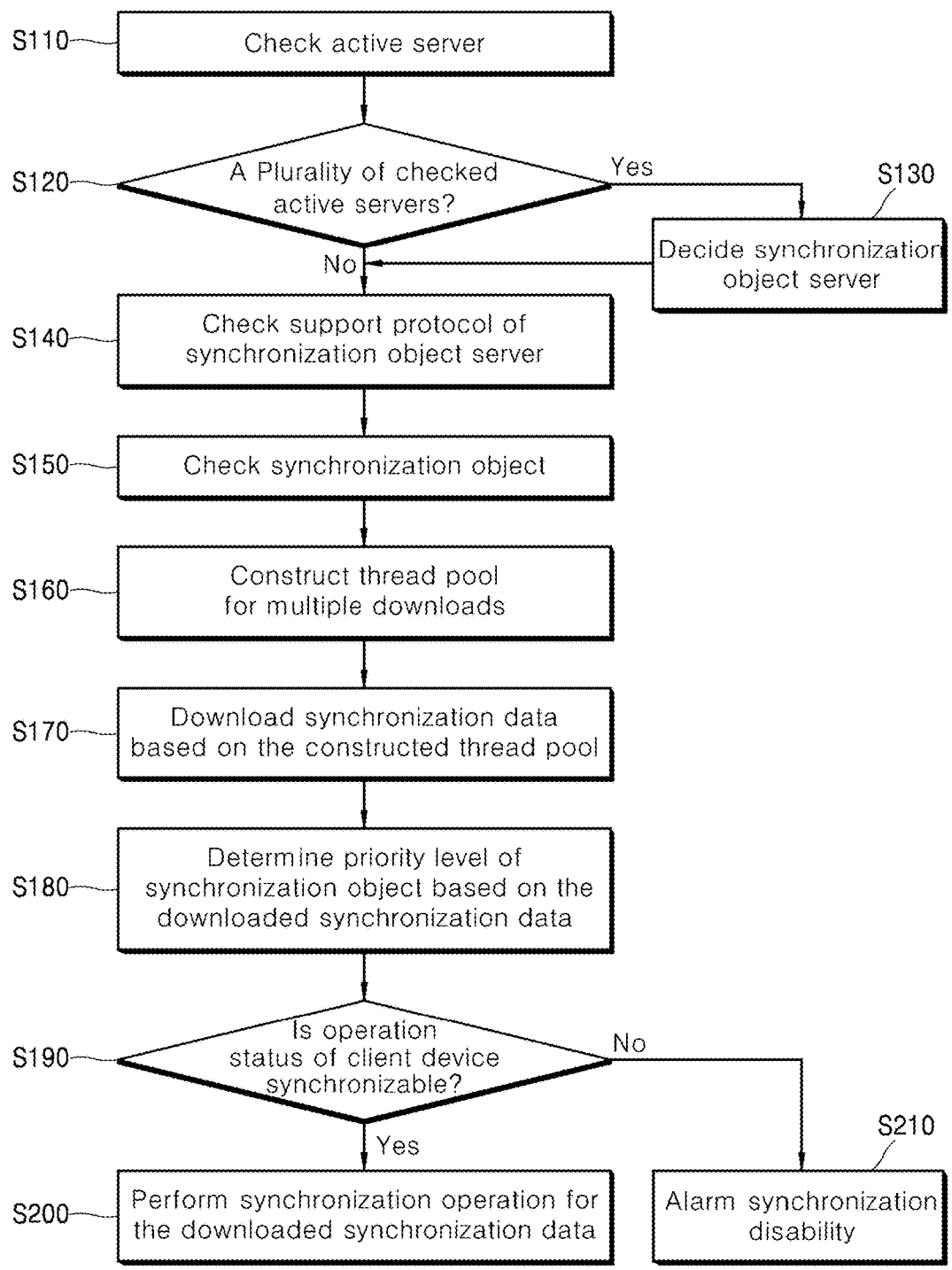

APPARATUS AND METHOD FOR DATA SYNCHRONIZING OF ENERGY MANAGEMENT SYSTEM

CROSS REFERENCE TO RELATED APPLICATIONS

This application claims the benefit of Korean Patent Application No. 10-2015-0125163, filed on Sep. 3, 2015, entitled "APPARATUS AND METHOD FOR DATA SYNCHRONIZING OF ENERGY MANAGEMENT SYSTEM", which is hereby incorporated by reference in its entirety.

BACKGROUND

1. Technical Field

The present disclosure relates to an energy management system and a data synchronizing method thereof and more particularly, to a data synchronizing method of a client device of an energy management system.

2. Description of the Related Art

An energy management system (EMS) refers to an integrated energy management solution to utilize the information & communication technology (ICT) and control technology to visualize and optimize a flow and usage of energy for buildings, places of business (factories), houses, social infrastructures (such as power grids and traffic networks), etc.

The energy management system is able to monitor the production and consumption of energy such as power and control energy-related facilities and equipment to promote rational energy utilization.

Accordingly, the energy management system is able to control recent renewable energy systems and energy storage systems as well as power generation systems and power transmission/transformation systems.

Such an energy management system may be classified into HEMS (Home EMS) for house only, BEMS (Building EMS) for building only, FEMS (Factory EMS) for factory only, CEMS (City/Community EMS) for entire region only including them, and the like, depending on applications.

As a kind of energy management system, a power feeder automation system to generalize the national power grids is a large-scaled power grid control system which controls the operation of power generation facilities associated with the power grids through always-information collection and load frequency monitoring for the entire power grids and performs economical dispatch with efficient management of the power grids. On system characteristics, such a power feeder automation system is constructed as a single system for the entire power grids. Examples of the power feeder automation system may include a domestic central EMS for generalizing the domestic power grids and a Jeju EMS responsible for a regional Jeju power grid.

In this way, the various kinds of energy management systems have different applications but have the same function in that they have commonly the function to monitor a flow of energy such as power (energy consumption and self-production) and the function to control facilities and equipment.

On the other hand, a terminal of a user who operates or monitors an energy management system is referred to as a client terminal. Such a client terminal has essentially to perform an update or synchronization operation related to the energy management system. However, on system characteristics that the energy management system has not to be stopped, the update or synchronization operation of the client terminal can be performed in a highly-limited manner.

In particular, if a client device of a field of power such as the energy management system uses a one-side automatic synchronization method to allow a user to set an update period or update automatic execution, it is difficult to operate the energy management system with consistency. Therefore, there is a need of a method for a client device to perform a proper synchronization operation depending on a synchronization object and the status of operation of the client device.

SUMMARY

It is an aspect of some embodiments of the present disclosure to provide a data synchronizing method of a client device of an energy management system, which is capable of performing an update or synchronization operation of the client device with high stability and efficiency.

In accordance with one aspect of some embodiments of the present disclosure, there is provided a synchronizing method of a client device in an energy management system, including: deciding a synchronization object server for downloading synchronization data; downloading the synchronization data from the decided synchronization object server; determining whether or not the status of operation of the client device is synchronizable, based on the downloaded synchronization data; and performing a synchronization operation for the downloaded synchronization data based on a result of the determination.

In some embodiments, the act of deciding a synchronization object server may include: checking an active server being operated, which is connected to the client device; if there exists a plurality of active servers, acquiring a server list for the plurality of active servers; and deciding a synchronization object server among the plurality of active servers based on the acquired server list.

In some embodiments, the act of downloading the synchronization data may include: acquiring a list of synchronization object data of the decided synchronization object server; and checking a synchronization object for synchronization data to be downloaded, based on the acquired list of synchronization object data.

In some embodiments, the act of downloading the synchronization data may include: constructing a thread pool for multiple downloads for downloading the checked synchronization object; and downloading the synchronization data based on the constructed thread pool.

In some embodiments, the act of determining whether or not the status of operation of the client device is synchronizable may include: determining an operation importance of the operation of the client device which corresponds to the downloaded synchronization data; and determining whether or not the downloaded synchronization data is synchronizable, based on the determined operation importance.

In some embodiments, the act of determining whether or not the downloaded synchronization data is synchronizable may include: if the determined operation importance includes a first level, determining that the downloaded synchronization data is not synchronizable; if the determined operation importance includes a second level, determining that the downloaded synchronization data is synchronizable with a check by a user for the downloaded synchronization data; and, if the determined operation importance includes a third level, determining that the downloaded synchronization data is synchronizable.

In some embodiments, the act of determining an operation importance of the operation of the client device may include: if the downloaded synchronization data is an execution file for the client device, determining the operation importance of the operation of the client device which corresponds to the downloaded synchronization data, as the first level; if the downloaded synchronization data is data corresponding to a monitoring screen of the client device, determining the operation importance of the operation of the client device which corresponds to the downloaded synchronization data, as the second level; and, if the downloaded synchronization data is a configuration file of the client device, determining the operation importance of the operation of the client device which corresponds to the downloaded synchronization data, as the third level.

In some embodiments, the act of performing a synchronization operation may include: if it is determined that the downloaded synchronization data is synchronizable, performing a synchronization operation for the downloaded synchronization data.

In some embodiments, the act of performing a synchronization operation may include: if it is determined that the downloaded synchronization data is synchronizable with a check by a user for the downloaded synchronization data, displaying a window for confirmation of execution of the synchronization operation for the downloaded synchronization data; and, if a confirmation input for the displayed confirmation window is acquired, performing a synchronization operation for the downloaded synchronization data.

In some embodiments, the act of performing a synchronization operation may include: if it is determined that the downloaded synchronization data is not synchronizable, performing an alarm operation to alarm the synchronization disability of the downloaded synchronization data.

According to some embodiments of the present disclosure, it is possible to provide a data synchronizing method of a client device of an energy management system, which is capable of performing an update or synchronization operation of the client device with high stability and efficiency.

BRIEF DESCRIPTION OF DRAWINGS

FIG. 3 is a flow chart illustrating a synchronizing method of the energy management system according to some embodiments of the present disclosure.

DETAILED DESCRIPTION

Figure 1:
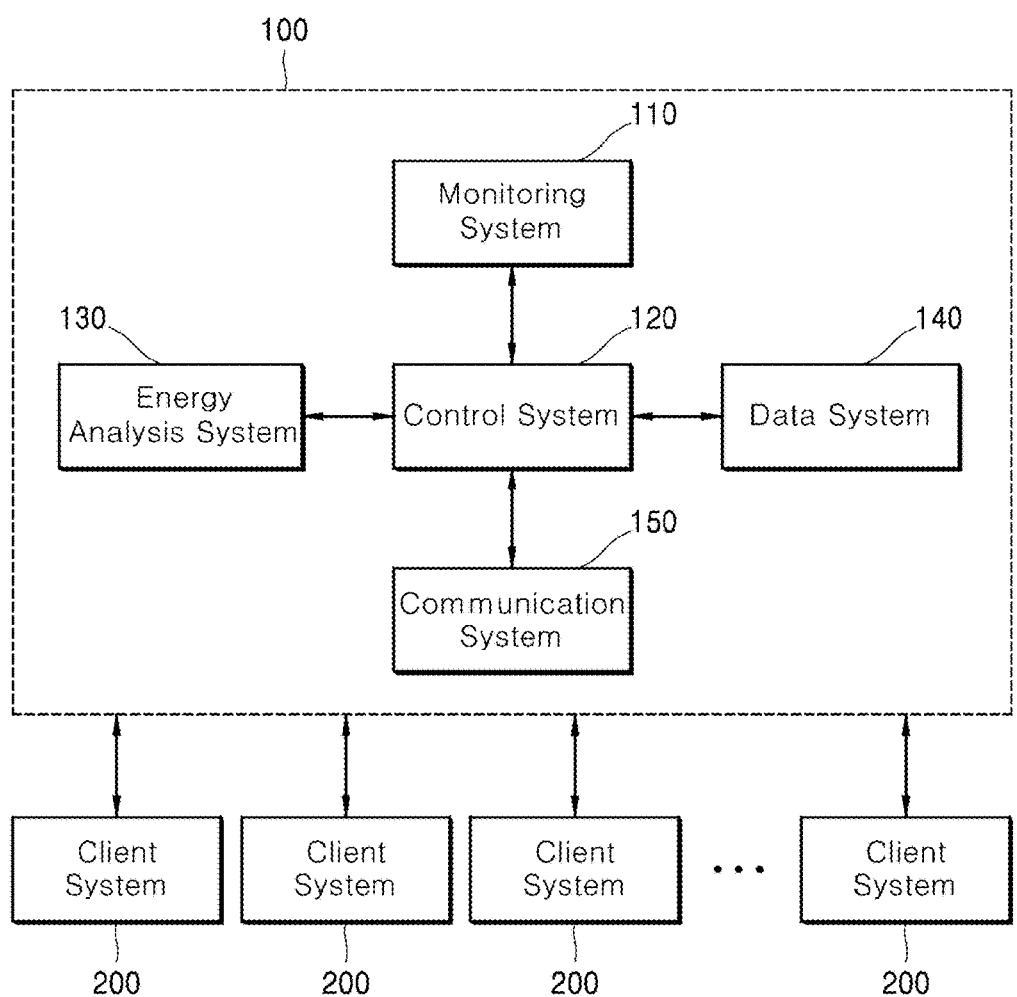
FIG. 1 is a block diagram for explaining the configuration of an energy management system according to some embodiments of the present disclosure.

Hereinafter, embodiments of the present disclosure will be described in detail with reference to the accompanying drawings. It should be understood that the present disclosure is not limited to the following embodiments, and that some embodiments are provided for illustrative purposes only. The scope of the disclosure should be defined only by the accompanying claims and equivalents thereof.

In the following description, the terms "module" and "part," which are suffixes for elements, are given or used alone or in combination for the purpose of facilitating the description, but these terms are not intended to make a distinction between both.

The above objects, features and advantages will become more clearly apparent from the following detailed description in conjunction with the accompanying drawings. However, the present disclosure is not limited to the following embodiments but may be implemented in different ways. Therefore, the technical ideas of the present disclosure can be easily understood and practiced by those skilled in the art. The spirit and scope of the present disclosure are defined by the claims. Throughout the drawings, the same or similar elements are denoted by the same reference numerals.

In the following detailed description of the present disclosure, concrete description on related functions or constructions will be omitted if it is deemed that the functions and/or constructions may unnecessarily obscure the gist of the present disclosure. The terms used herein are defined in view of functions in some embodiments and may be varied depending on intention of a user or operator or practices. Therefore, the definition of the terms should be made based on the contents over the specification.

Combinations of blocks in the accompanying drawings and steps in a flow chart may be performed according to computer program instructions. These computer program instructions can be installed in general-purpose computers, special-purpose computers or other processors of programmable data processing equipment. Therefore, the instructions executed by the computers or other processors of programmable data processing equipment create means for performing functions described in blocks in the drawings or in steps in the flow chart. These computer program instructions can be stored in computer-usable or computer-readable memories which can assist in the computers or other processors of programmable data processing equipment to implement particular functions in particular manners. Therefore, the instructions stored in the computer-usable or computer-readable memories can be used to make products containing instruction means for performing the functions described in the blocks in the drawings or in the steps in the flow chart. The computer program instructions can also be installed in the computers or other processors of programmable data processing equipment. Therefore, a sequence of operation steps can be performed on the computers or other processors of programmable data processing equipment to produce computer-executable processes. In addition, the instructions operating the computers or other processors of programmable data processing equipment can provide steps for executing the functions described in the blocks in the drawings or in the steps in the flow chart.

In addition, the blocks or the steps may represent portions of modules, segments or codes including one or more executable instructions for executing a specified logical function(s). In addition, in some alternative embodiments, it should be noted that the functions described in the blocks or steps may be performed out of a specified sequence. For example, two successive blocks or steps may be performed substantially at once or may be sometimes performed in a reverse order depending on a corresponding function.

Hereinafter, the configuration of an energy management system according to some embodiments of the present disclosure will be described in detail with reference to FIG. 1.

FIG. 1 is a block diagram for explaining the configuration of an energy management system according to some embodiments of the present disclosure.

Referring to FIG. 1, an energy management system (EMS) 10 may include an energy management apparatus 100 and a client device 200.

The energy management apparatus 100 may measure and monitor energy consumption in real time and also control energy-related facilities, equipment and so on.

The energy management apparatus 100 may include a monitoring system 110, a control system 120, an energy analysis system 130, a data system 140 and a communication system 150.

The monitoring system 110 may measure, aggregate and store energy consumption of facilities and equipment. The monitoring system 110 may collect a variety of energy-related data including the energy consumption from one or more of a sensor, valve, measuring instrument and facility operation software. In some embodiments, the monitoring system 110 may collect data on power production and transmission of a power system and associated data.

The control system 120 may control energy-related facilities and equipment based on the data collected by the monitoring system 110. In addition, based on the data collected by the monitoring system 110, the control system 110 may monitor a flow and usage of energy and detect whether or not the energy usage includes a deviation which is higher by a certain level than a normal value or a predicted value. Upon detecting the deviation, the control system 120 may perform an alarm operation to alarm the fact. In some embodiments, the control system 120 may control facilities and equipment related to a power system and monitor a usage and flow of power based on data collected in relation to the power system. In addition, the control system 120 may monitor whether or not the power usage includes a deviation which is higher by a certain level than a normal value or a predicted value. Upon detecting the deviation, the control system 120 may perform an alarm operation to alarm the fact.

The energy analysis system 130 may analyze the energy usage over time based on the data collected by the monitoring system 110. In addition, the energy analysis system 130 may also predict the energy consumption after a certain period based on the energy analyzed energy usage.

The data system 140 may store a variety of data related to the energy management system 10. In addition, the data system 140 may back up a variety of data related to the energy management system 10. The data system 140 may comprise of a plurality of different storage devices in which data and backup data related to the energy management systems 10 are stored.

The communication system 150 may facilitate communication between components constituting the energy management apparatus 10 and also facilitate communication between the management apparatus 10 and a different device or system. For example, the communication system 150 may facilitate communication between the energy management apparatus 100 and the client device 200.

Each of the above-described monitoring system 110, control system 120, energy analysis system 130, the data system 140 and communication system 150 may be implemented with one or more servers. For example, each of the monitoring system 110, control system 120, energy analysis system 130, the data system 140 and communication system 150 may be implemented with one corresponding server. Alternatively, the monitoring system 110, control system 120, energy analysis system 130, the data system 140 and communication system 150 may be incorporated in a signal server.

The client device 200 may offer a variety of information related to the energy management system 10 to a user who operates or monitor the energy management system 10 and receive a variety of input related to the energy management system 10. Specifically, the client device 200 may acquire a variety of information related to the energy management system 10 from the energy management apparatus 100 and output the acquired information. In addition, the client device 200 may receive a variety of inputs related to the energy management system 10 from the user and deliver the received inputs to the energy management apparatus 100. Further, a plurality of clients 200 may be included in the energy management system 10 and may be connected to the energy management apparatus 100.

The configuration of the client device 200 will be described with reference to FIG. 2.

Figure 2:
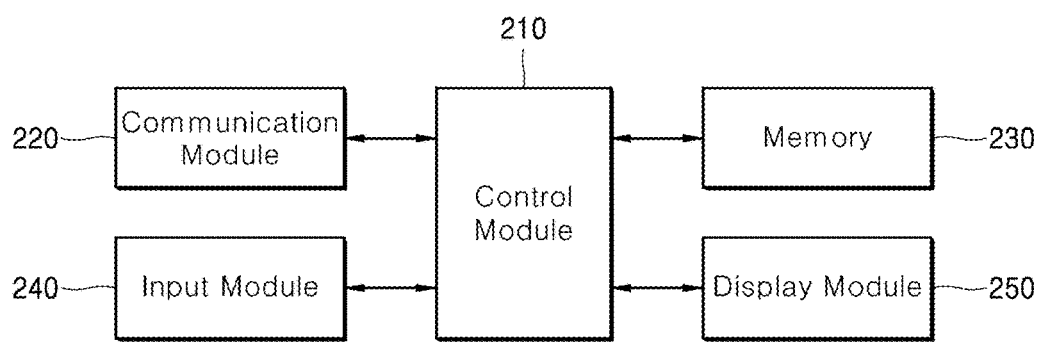
FIG. 2 is a block diagram for explaining the configuration of a client device according to some embodiments of the present disclosure.

FIG. 2 is a block diagram for explaining the configuration of the client device according to some embodiments of the present disclosure.

Referring to FIG. 2, the client device 200 may include a control module 210, a communication module 220, a memory 230, an input module 240 and a display module 250.

The control module 210 may control the overall operation of the client device 200.

The communication module 220 may facilitate communication between the client device 200 and the energy management apparatus 100. In addition, the communication module 220 may facilitate communication between the client device 200 and another client device 200.

The memory 230 may store a variety of data. For example, the memory 230 may store a variety of data related to the operation of the energy management system 10.

The input module 240 may receive a variety of inputs related to the energy management system 10.

The display module 250 may display a variety of information related to the energy management system 10.

Hereinafter, a data synchronizing method of the energy management system 10 will be described based on the description on the energy management system 10, energy management apparatus 100 and client device 200.

FIG. 3 is a flow chart illustrating a data synchronizing method of the energy management system according to some embodiments of the present disclosure.

Referring to FIG. 3, the client device 200 checks an active server to be synchronized (S110).

The control module 210 of the client device 200 can communicate with servers corresponding to one or more systems included in the energy management apparatus 100 through the communication module 220. Then, the control module 210 can check the active server being operated among the servers corresponding to the one or more systems included in the energy management apparatus 100.

The client device 200 determines whether or not the number of checked active servers is two or more (S120). If so, the client device 200 decides a synchronization object server (S130).

The control module 210 of the client device 200 can determine whether or not the number of checked active servers is two or more, and, if so, acquire a server list of the plurality of checked active servers. Then, the control module 210 can decide a synchronization object server among the plurality of active servers based on the acquired server list. For example, based on a defined rule which may refer to a priority, the control module 210 can decide a synchronization object server. The control module 210 can also decide a synchronization object server which corresponds to a synchronization object or a kind of synchronization operation such as a line of synchronization file.

On the other hand, if the number of checked active servers is one, the above-described process of deciding a synchronization object server may be omitted.

The client device 200 checks a support protocol of the synchronization object server (S140).

The control module 210 can check a support protocol of an active server decided as the synchronization object server. The "support protocol" of the active server may refer to a connection protocol. For example, the support protocol may be one or more of HTTP (Hyper Text Transfer Protocol), HTTPS (Hyper Text Transfer Protocol over Secure Socket Layer) and FTP (File Transfer Protocol). The control module 210 may determine a priority for a plurality of protocols supported by the decided active server.

The client apparatus 200 can check a synchronization object based on information on the decided synchronization object server (S150).

The control module 210 of the client device 200 can compare one or more of update data and synchronization object data of the decided synchronization object server with the data stored in the memory 230 of the client device 200 and check the synchronization object based on a result of the comparison. For example, the control module 210 can acquire a list for the latest version of update data and synchronization object data of the decided synchronization object server and compare the acquired list with the data stored in the memory 230. Then, the control module 210 can check data of a version previous to the version of last acquired from the synchronization object server, among the data stored in the memory 230, as the synchronization object.

The client device 200 constructs a thread pool for multiple downloads for the checked synchronization object (S160).

In more detail, the client device 200 can form individual threads which access the checked synchronization object server, and can construct the thread pool by grouping the individual threads for multiple downloads.

Accordingly, the control module 210 of the client device 200 can generate a download list to minimize a time taken to download the synchronization object according to the constructed thread pool. The number of synchronization object servers may be two or more. Accordingly, the control module 210 can construct a thread pool for access to each of the plurality of servers which is a synchronization object, and can generate a download list to minimize a time taken to download a checked synchronization object.

The client device 200 downloads synchronization data according to the constructed thread pool (S170).

The control module 210 of the client device 200 can download synchronization data from a synchronization object server through the communication module 220 based on the constructed thread pool. In addition, the control module 210 can download a plurality of synchronization data from a plurality of synchronization object servers based on the constructed thread pool.

Then, the control module 210 can store the downloaded synchronization data in the memory 230. In addition, the control module 210 can store the downloaded synchronization data in response to the status of operation of the client device 200 and can prepare a synchronization operation.

In addition, the control module 210 can back up the previous data corresponding to the downloaded synchronization data in the memory 230.

The client device 200 determines whether or not the operation status of the client device 200 is a synchronizable status, based on the downloaded synchronization data (S190).

The control module 210 of the client device 200 can check a type of the downloaded synchronization data and determine whether or not the operation status of the client device 200 is a synchronizable status, based on the checked type of the downloaded synchronization data.

Specifically, the control module 210 can determine an operation importance of the operation of the client device 200 corresponding to the downloaded synchronization data and may or not synchronize the downloaded synchronization data based on the determined operation importance.

In some embodiments, if the operation importance of the operation of the client device 200 corresponding to the downloaded synchronization data is a first level, the control module 210 may determine that the downloaded synchronization data is not synchronizable. For example, if the downloaded synchronization data is a file being executed, the control module 210 may determine that the downloaded synchronization data is not synchronizable. On the other hand, if the operation status of the client device 200 corresponds to a specified level, the control module 210 can determine that an executed file as the downloaded synchronization data is synchronizable.

In some embodiments, if the operation importance of the operation of the client device 200 corresponding to the downloaded synchronization data is a second level, the control module 210 may determine that the downloaded synchronization data is not synchronizable without a check by a user. On the other hand, if the operation importance of the operation of the client device 200 corresponding to the downloaded synchronization data is the second level, the control module 210 may determine that the downloaded synchronization data is synchronizable with a check by a user. For example, if the downloaded synchronization data is data related to a monitoring screen, the control module 210 may determine that the downloaded synchronization data is not synchronizable without a check by a user.

In other embodiment, if the operation importance of the operation of the client device 200 corresponding to the downloaded synchronization data is a third level, the control module 210 may determine that the downloaded synchronization data is synchronizable. For example, if the downloaded synchronization data is a configuration file, the control module 210 may determine that the downloaded synchronization data is synchronizable. However, if this configuration file is a configuration file associated with a file being executed, the control module 210 may determine that the downloaded synchronization data is not synchronizable.

In other embodiment, if the operation importance of the operation of the client device 200 corresponding to the downloaded synchronization data is a fourth level, the control module 210 may determine that the downloaded synchronization data is synchronizable at a preset period. For example, if the downloaded synchronization data is a configuration file to be downloaded for each preset period, the control module 210 may determine that the downloaded synchronization data is synchronizable at the preset period. This allows the control module 210 to perform a synchronization operation for synchronization data of the fourth level only at the preset period.

On the other hand, if the operation of the client device 200 corresponding to the downloaded synchronization data is an alarm operation for the entire system or the energy management system 10, the control module 210 may determine that the operation importance includes the highest level. Accordingly, the control module 210 may determine that the downloaded synchronization data is not synchronizable.

The above-described determination on whether or not the downloaded synchronization data is synchronizable is not limitative but just illustrative. It is to be understood that a result of the determination may be varied depending on the type of the synchronization data, the operation status of the client device 200, and a setting by a user or designer.

If it is determined that the downloaded synchronization data is synchronizable, the client device 200 performs a synchronization operation for the downloaded synchronization data (S200).

If it is determined that the downloaded synchronization data is synchronizable, the control device 210 of the client device 200 can perform a synchronization operation for the downloaded synchronization data.

In addition, if it is determined that the downloaded synchronization data is synchronizable with a check by a user, the control device 210 of the client device 200 can display a window for confirmation of execution of the synchronization operation for the downloaded synchronization data on the display module 250. Upon receiving a synchronization operation input through the input module 240, the control module 210 can perform the synchronization operation for the downloaded synchronization data. Upon displaying the window for confirmation of execution of the synchronization operation on the display module 250, the control module 210 can further display information on events which may take happen depending on the type of the synchronization data and the execution of the synchronization operation.

In addition, if the synchronization operation input is not received, the control module 210 can display a window for confirmation of execution of the synchronization operation periodically on the display module 250. In addition, the control module 210 can change a period at which the window for confirmation of execution of the synchronization operation is displayed, depending on the operation importance of the operation of the client device 200 which corresponds to the downloaded synchronization data. In addition, depending on a setting by a user, the control module 210 may not display the window for confirmation of execution of the synchronization operation or may change the period at which the window for confirmation of execution of the synchronization operation is displayed.

If the client device 200 need be restarted after performing the synchronization operation, the control module 210 may restart the client device 200 according to specified conditions.

On the other hand, if it is determined that the downloaded synchronization data is not synchronizable, the client device 200 performs an alarm operation to alarm the synchronization disability of the downloaded synchronization data (S210).

When it is determined that the downloaded synchronization data is not synchronizable, the control module 210 of the client device 200 can perform an alarm operation to alarm the synchronization disability based on the operation importance, without performing the synchronization operation for the downloaded synchronization data. For example, the control module 210 can display an alarm window to alarm the synchronization disability on the display module 250. The control module 210 can periodically display an alarm window to alarm the synchronization disability on the display module 250. In addition, the control module 210 can change a period at which the alarm window to alarm the synchronization disability is displayed, depending on the operation importance of the operation of the client device 200 which corresponds to the downloaded synchronization data. In addition, depending on a setting by a user, the control module 210 may not display the alarm window to alarm the synchronization disability or may change the period at which the alarm window to alarm the synchronization disability is displayed.

According to some embodiments of the present disclosure, the above-described method can be implemented with instructions stored in a processor-readable medium, such as a ROM, RAM, CD-ROM, magnetic tape, floppy disk, optical data storage or the like, and may be implemented in the form of a carrier wave transmitted through a network such as Internet.

The above-described embodiments are not intended to be limited in the configurations and methods described so far but may be used alone or in combination and may be modified in different ways.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of some embodiments described herein may be made without departing from the spirit of the disclosures. The accompanying claims and their equivalents are intended to cover such forms or modifications as would fall within the scope and spirit of the disclosures. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A synchronizing method of a client device in an Energy Management System (EMS) that comprises the client device and an energy management apparatus for monitoring energy consumption and controlling energy related facilities or equipment, the method comprising:
 determining a synchronization object server for downloading synchronization data;
 downloading the synchronization data from the synchronization object server;
 determining whether the status of operation of the client device is synchronizable based on the downloaded synchronization data; and
 performing synchronization for the downloaded synchronization data based at least on a result of the determination,
 wherein determining whether the status of operation of the client device is synchronizable includes:
 determining an operation importance level of the operation of the client device corresponding to the downloaded synchronization data; and determining whether the downloaded synchronization data is synchronizable based at least on the determined operation importance level,
wherein determining whether the downloaded synchronization data is synchronizable includes:
if the determined operation importance level is a first level, determining that the downloaded synchronization data is not synchronizable;
if the determined operation importance level is a second level, determining that the downloaded synchronization data is synchronizable with a check by a user for the downloaded synchronization data; and
if the determined operation importance level is a third level, determining that the downloaded synchronization data is synchronizable.

2. The synchronizing method according to claim 1, wherein determining the synchronization object server includes:
checking whether a server connected to the client device is active;
if a plurality of servers are active, receiving a server list for the plurality of servers; and
determining the synchronization object server from the plurality of active servers based at least on the received server list.

3. The synchronizing method according to claim 2, wherein downloading the synchronization data includes:
receiving a list of synchronization object data of the synchronization object server; and
checking a synchronization object for synchronization data to be downloaded, based at least on the received list of synchronization object data.

4. The synchronizing method according to claim 3, wherein downloading the synchronization data includes:
generating a thread pool for multiple downloads for downloading the checked synchronization object; and
downloading the synchronization data based at least on the generated thread pool.

5. The synchronizing method according to claim 1, wherein determining the operation importance level of the operation of the client device includes:

if the downloaded synchronization data comprises an execution file for the client device, determining the operation importance level of the operation of the client device which corresponds to the downloaded synchronization data, as the first level;
if the downloaded synchronization data comprises data corresponding to a monitoring screen of the client device, determining the operation importance level of the operation of the client device which corresponds to the downloaded synchronization data, as the second level; and
if the downloaded synchronization data comprises a configuration file of the client device, determining the operation importance level of the operation of the client device which corresponds to the downloaded synchronization data, as the third level.

6. The synchronizing method according to claim 1, wherein performing the synchronization includes:
if it is determined that the downloaded synchronization data is synchronizable, performing synchronization for the downloaded synchronization data.

7. The synchronizing method according to claim 1, wherein performing the synchronization includes:
if it is determined that the downloaded synchronization data is synchronizable with the check by the user for the downloaded synchronization data, displaying a window for confirmation of execution of the synchronization operation for the downloaded synchronization data; and
if a confirmation input for the displayed confirmation window is received, performing the synchronization for the downloaded synchronization data.

8. The synchronizing method according to claim 1, wherein performing the synchronization includes:
if it is determined that the downloaded synchronization data is not synchronizable, performing an alarm to alarm the synchronization disability of the downloaded synchronization data.

* * * * *